Dec. 3, 1957 R. C. HARRISON 2,815,222
TRICYCLE DRIVING AND BRAKING ARRANGEMENT
Filed Feb. 23, 1956 3 Sheets-Sheet 1
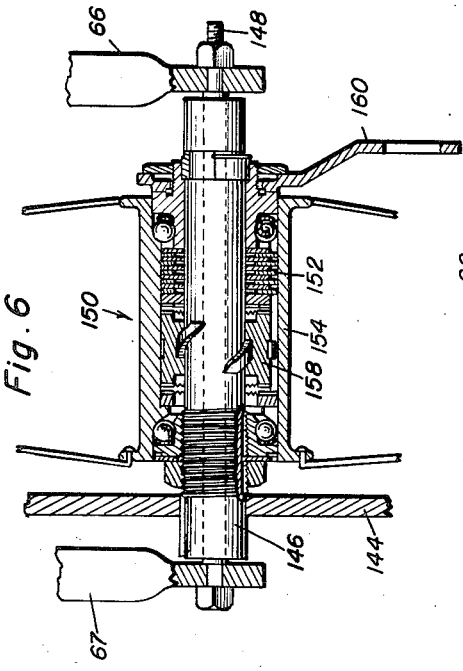
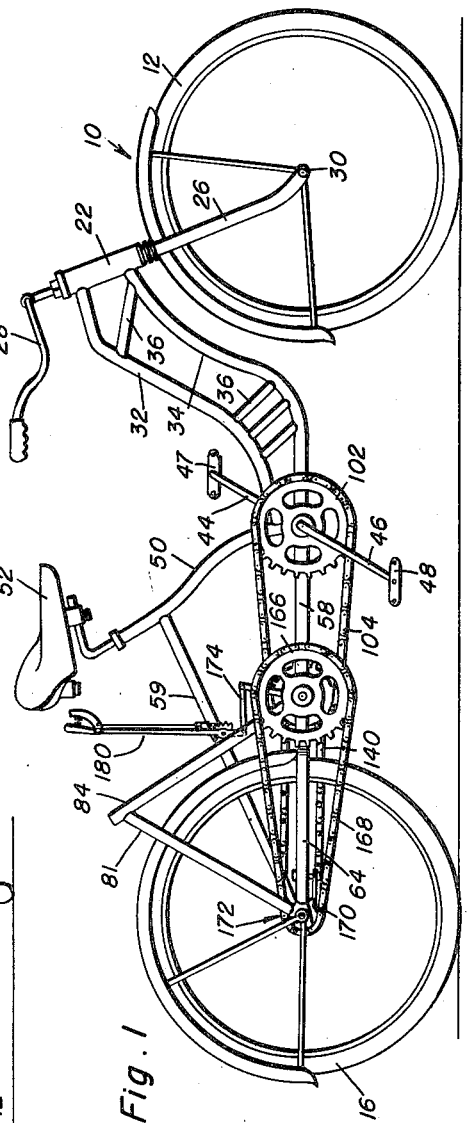
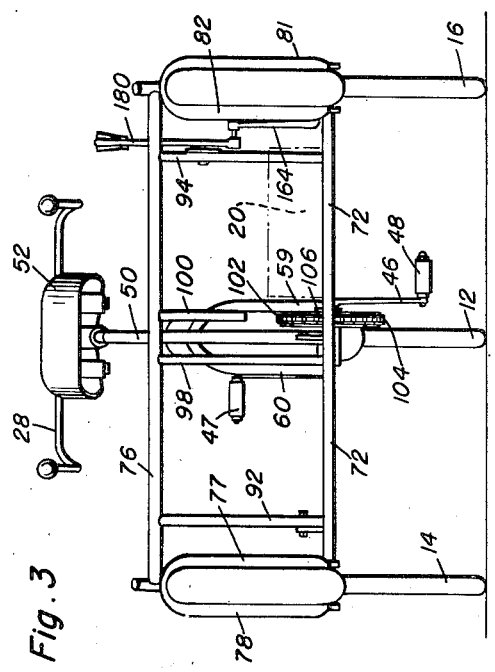
Roy C. Harrison
INVENTOR.
BY *Clarence A. O'Brien*
*and Harvey B. Jackson*
Attorneys

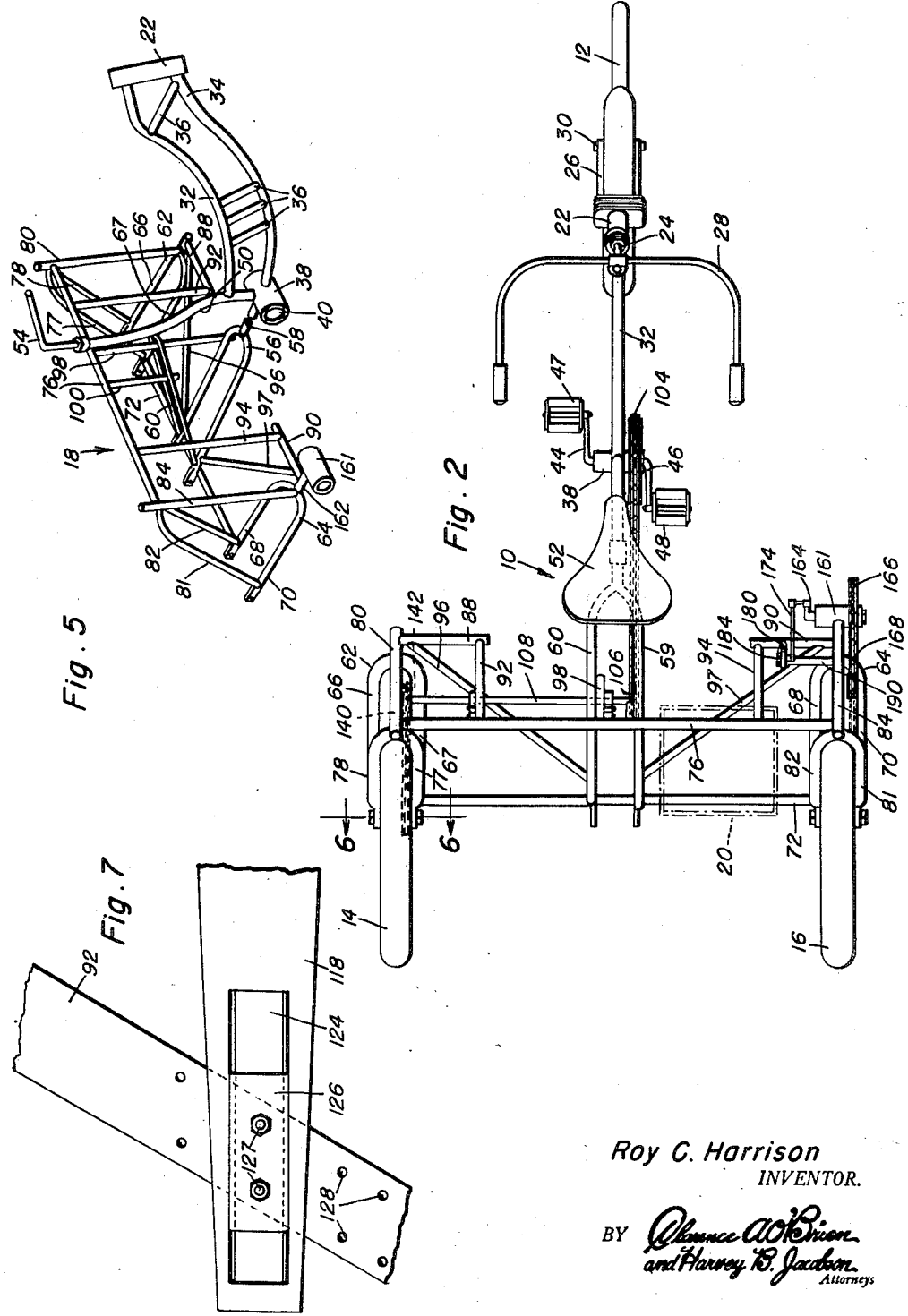

Dec. 3, 1957  R. C. HARRISON  2,815,222
TRICYCLE DRIVING AND BRAKING ARRANGEMENT
Filed Feb. 23, 1956  3 Sheets-Sheet 3

Roy C. Harrison
INVENTOR.

BY Clarence A. O'Brien
and Harvey B. Jackson
Attorneys

United States Patent Office 2,815,222
Patented Dec. 3, 1957

2,815,222

TRICYCLE DRIVING AND BRAKING ARRANGEMENT

Roy C. Harrison, Gait, Calif., assignor of fifty percent to Lloyd G. Harrison, Concord, Calif.

Application February 23, 1956, Serial No. 567,174

2 Claims. (Cl. 280—261)

This invention relates to cycles and particularly to cycles of the tricycle type.

An object of the present invention is to provide an improved cycle which utilizes standard parts to yield a new convenience in cycle operation.

Another object of the invention is to provide an improved cycle having a frame which is constructed to accommodate a front center steering wheel together with a first and a second rear wheel, the rear wheels being laterally spaced and disposed on opposite sides of the steering wheel, there being in the frame a pair of pedals which, through a sprocket and chain drive actuates the first of the rear wheels, the latter being fitted with a coaster brake so that in normal cycle operation reverse movement of the pair of pedals energizes the brake to decelerate or stop the cycle.

One of the important features of the present invention is the coaster brake which is associated with the axle that mounts the second wheel for rotation, this latter coaster brake functioning as a parking or emergency brake in that it has a manually operated lever actuated chain and sprocket device conveniently accessible to the cyclist on the cycle saddle.

A more general object of the invention is to provide a tricycle of the type which is fully capable of supporting and transporting an adult, the tricycle being particularly useful by people who have less than an average balance, the vehicle frame construction being such that it is extremely sturdy and stable.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational view of the cycle;

Figure 2 is a top plane view of the cycle of Figure 1;

Figure 3 is a rear elevational view of the cycle of Figure 1;

Figure 5 is a perspective view of the cycle frame;

Figure 6 is an enlarged sectional view taken on the plane of line 6—6 of Figure 2 and illustrating a standard coaster brake which is used for both braking and driving the tricycle; and Figure 7 is an enlarged fragmentary elevational view of an adjustment structure used in the cycle.

Figure 4:
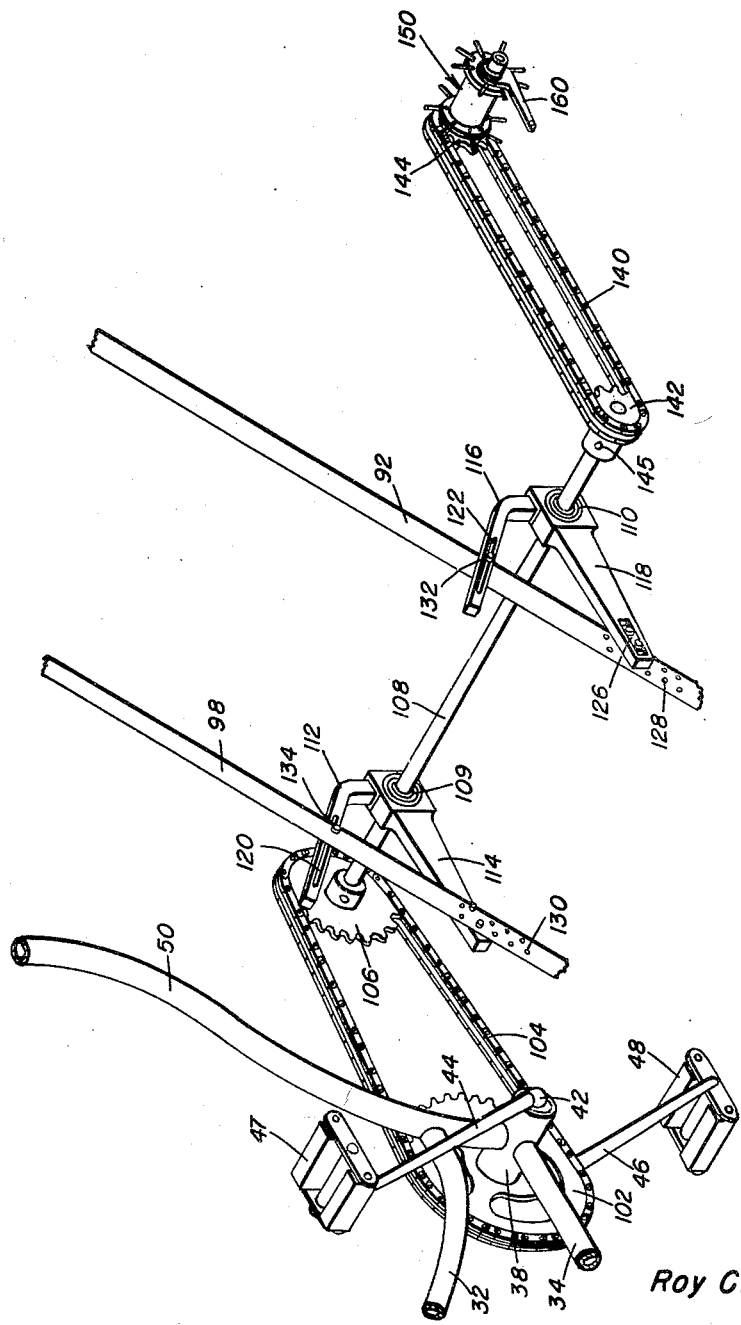
Figure 4 is a fragmentary perspective view showing the drive for the cyclist.

The cycle 10 is of the three wheel type including a front wheel 12, a first rear wheel 14 and a second rear wheel 16. The front wheel 12 is on the longitudinal center line of frame 18 (Figure 5), while wheels 14 and 16 are laterally spaced and equidistant from the steering center wheel 12 and are located therebehind. Each wheel is fitted with a mud guard and other appurtenances may be attached to the cycle, such as one or more lights, a horn or other sounding device, a saddle or a storage box, such as schematically indicated at 20. These accessories are optional with the user of the cycle 10.

The cycle frame 18 has at its forward extremity an inclined sleeve 22 in which the spindle 24 of front fork 26 is mounted for rotation. Handle bars 28 are adjustably secured to spindle 24 while axle 30 is carried by the lower ends of the fork. Wheel 12 is mounted for rotation on axle 30. Upon steering movement of the handle bars 28 the wheel 12 is directed to the left or right.

A pair of downwardly curved bars 32 and 34 are welded or otherwise fixed to the sleeve 22 at vertically spaced places thereon. Braces 36 extend across and are secured to the bars 32 and 34 so that the necessary rigidity and strength of construction will result. Hub 38 is brazed, welded or otherwise fixed to the rear end of bar 34, the hub having a bore 40 in which to accommodate crankshaft 42 having cranks 44 and 46 at the extremities of which there are pedals 47 and 48.

A rearwardly curved, upwardly extending tubular support 50 is fixed at its lower end to hub 38 and is also fixed thereadjacent to the bar 32. A seat 52, preferably a saddle, is secured by standard means including seat support 54, in an adjustable position on tubular support 50. A yoke 56 has a bar 58 protruding from the joined end of the legs thereof. This bar is fixed to hub 38 and protrudes as an extension of bar 34, rearwardly of the hub 38.

A pair of bars 59 and 60 are secured at their forward ends to the tubular support 50 intermediate the top and bottom of this support. The opposite ends of the pairs of bars 59 and 60 are fixed to the sides of yoke 56 near or at the rear terminals thereof. A first horizontally disposed fork 62 is located on one side of yoke 56, and a second horizontally disposed yoke 64 is disposed on the opposite side of the yoke 56. Fork 62 has sides 66 and 67, while fork 64 has sides 68 and 70. Sides 67 and 68 are held rigid and fixed together by means of a cross member 72 that is welded or otherwise fixed thereto. This cross member is also welded or otherwise fixed to the sides of yoke 56. An upper cross member 76 is used for the further support of the forks 62 and 64. A pair of supports 77 and 78 are fixed at their upper ends to a bar 80 and at their lower ends to the sides 66 and 67 of fork 62. The bar 80 is fixed to the upper cross member 76 and also to the fork 62 at the front end thereof. A similar construction is provided for the fork 64. It includes supports 81 and 82 that are fixed at their lower ends to the sides 68 and 70 of fork 64 together with a front bar 84 which is welded to the upper end of supports 82 and 81 and also to the upper cross member 76. This front bar 84 is also welded or otherwise fixed to the front of the fork 64.

An inwardly extending bar 88 is fixed to the front end of fork 62. A similar, inwardly extending bar 90 is secured to the front end of fork 64. A hanger 92 is welded to the upper cross member 76 and also to the bar 88. Hanger 94 is welded to cross member 76 and to the inwardly extending bar 90. For further rigidity diagonal braces 96 and 97 are secured to the bars 88 and 90 and also to the sides of yoke 56. Braces 98 and 100 are fixed to the upper cross member and to the yoke 56 and bar 59 respectively. It is observed from inspection of Figure 5 that the vehicle frame construction is made from a number of forks and standard bicycle frame portions, whereby the frame is almost wholly made from salvage parts. In commercial production various economies of weight and fabrication will be realized. With a construction as described this far, the lower cross member 72 together with one of the diagonal braces, for example brace 97 provides a seat on which to support a tool box or other receptacle 20 in which to store things.

The upper cross member 76 provides an ideal hanger on which to support saddle bags or the like.

As seen best in Figures 2 and 4 a sprocket 102 is fixed to the crank shaft 42, and there is a chain 104 entrained around the sprocket. This chain is also operatively connected with sprocket 106, the latter being located at the end of shaft 108. This shaft is mounted for rotation in bearings 109 and 110. Bearing 109 is carried in a bearing block from which arms 112 and 114 extend. Bearing 110 is in a bearing block from which arms 116 and 118 extend. Arms 112 and 116 have slots 120 and 122 respectively extending longitudinally therein, while the arms 114 and 118 have slots 124 provided with beveled side walls. A wedge block 126 is located in each of the slots 124 of each arm 114 and 118, and bolts 127 extend therethrough, the bolts being in selected apertures of the group 128 of apertures in brace 92, while the bolts in the opposite wedge shaped block are fitted in the group 130 of apertures formed in the brace 98. Block 126 is adjustable longitudinally in slot 124 to the desired position and then locked in place by tightening bolts 127 to thereby bring the sloping walls of block 126 and slot 124 into firm frictional contact. Bolt 132 extends through slot 122 and is in an aperture in the brace 92, while the bolt 134 extends through slot 120 and is disposed in an aperture in brace 98. By adjusting the arms with respect to frame brace members 92 and 98 through selection of apertures in the groups 128 and 130 and by sliding the bolts 132 and 134 in their slots, the chain 104 may be tightened and the sprockets aligned, and the same holds true of chain 140. Chain 104 is adjusted first by loosening the bolts of arms 112, 114, 116 and 118 and sliding the arms on their respective bolts. Then chain 140 is adjusted by loosening the nuts of axle 148 which extends through hub 150, the hub to which sprocket 144 is attached, and sliding the axle assembly backward in the slots provided. Sprocket 142 is secured to the end of shaft 108 and has chain 140 entrained therearound.

One of the important features of this cycle is the fact that sprockets 106 and 142, on shaft 108, can easily be changed to sprockets having a greater or a smaller amount of teeth. By selecting sprockets and installing them on the ends of shaft 108 this cycle can be made to have just any gear ratio, either high or low, desired by the rider. These sprockets are ordinary bicycle sprockets but have been welded onto a hub which just exactly fits the shaft 108. A setscrew 145 in each hub of sprockets 106 and 142 of shaft 108, holds the sprockets on the shaft. To remove these sprockets, simply loosen the setscrews and lift off. Countersink places are drilled in, near the end, shaft 108, with a small drill bit, for the setscrews. These setscrews screw through the hub of sprockets 106 and 142 and rest firmly against the bottom of the countersink places which are drilled into shaft 108, so as to prevent the sprockets from slipping on the shaft 108, when being rotated. These setscrews are beveled on the bottom end and exactly fit the countersink places of shaft 108.

Drive and brake sprocket 144 is enmeshed with chain 140. Sprocket 144 is drivingly connected with sleeve 146, as by being keyed thereto, the latter having an axle 148 extending through it. The sleeve 146 and sprocket 144 constitute a part of a standard coaster brake 150 whose structure and operation is well known at this date. The coaster brake 150 includes cooperating brake disks 152 mounted in wheel hub 154, the brake disks being used to decelerate the rotation of the hub 154 when sprocket 144 is turned in one direction due to the action of laterally shiftable connector 158 on sleeve 146. However, a drive connection is established between the sprocket 144 and the hub 154 of the wheel upon rotation of sprocket 144 in the opposite direction. Brake arm 160 is anchored to a part of frame 18 in the customary way. For the specific operation of the coaster brake mechanism 150 of Figure 6, reference is made to U. S. Patent No. 1,556,256 issued to the New Departure Manufacturing Company of Bistol, Connecticut. It is understood that various other commercially available coaster brakes may be selected in lieu of the coaster brake 150. It is necessary only that the selected brake mechanism function as a coaster brake, that is establish a drive connection when the sprocket for actuating the cycle is rotated in one direction and upon rotation of the same sprocket in the opposite direction, function as a brake.

A hub 161 is fixed at the forward end of a small length of pipe 162 which is at the front of fork 64. A crank having crank arm 164, is mounted rotatably in the hub 161, there being a sprocket 166 at the opposite end of the crank. Chain 168 is entrained around the sprocket 166 and around sprocket 170. The latter sprocket constitutes a part of the coaster brake 172 with which there is an axle operatively connected in order to mount the wheel 16 for rotation. In view of the presence of the coaster brake 172, the wheel 16 is capable of functioning as a braking wheel upon movement of the sprocket 170 in the proper direction. This is achieved by rotating crank arm 164 through a link 174. This link is pivoted at one end to the crank arm 164 and is pivoted at the other end to a brake lever 180. Brake lever 180 has a pawl which is operable between the teeth of the fixed gear segment 184, the latter being secured to a part of frame 18 and the brake lever 180 being carried by brace 190 which is welded on the rod 84.

In operation the cyclist climbs upon the seat 52 and releases the coaster brake 172 by squeezing the pawl operator on the hand lever 180 and moving the hand lever in one direction. This revolves the sprocket 166 and through the chain 168 rotates the sprocket 170 of the coaster brake 172. The cyclist is now ready to propel the cycle forward by using the pedals 47 and 48 in the customary manner. By rotating the crank 42 through the use of pedals 47 and 48, the shaft 108 is revolved thereby causing a rotation of the drive sprocket 144 of the coaster brake 150. The train for the drive is seen in Figure 4. When the cyclist decides to stop he rotates the crank 42 in the opposite direction thereby rotating the drive sprocket 144 in the opposite direction. This causes the brake to become applied thereby stopping or decelerating the wheel 14. In emergencies the hand brake lever 180 may be pulled in order to actuate the coaster brake 172. However, the more frequent and primarily intended use of the hand brake lever 180 is for parking inasmuch as the coaster brake 172 may be set by pulling the lever 180 in one direction and locking it in place.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a cycle, a frame including a seat, a first and a second rear fork, a first and a second wheel mounted for rotation in said first and second forks, braces extending from said forks, a cross member connected to said braces, a front fork mounted in a plane between said first and second forks and forwardly of said first and second forks, a hub disposed between said front fork and said first and second forks, a crank mounted for rotation in said hub and having pedals thereon, a first coaster brake operatively connected with said first wheel, means drivingly connected between said first coaster brake and said crank to actuate the coaster brake for both driving and decelerating the cycle, said means that are drivingly connected between said first coaster brake and said crank including a shaft extending transversely of said frame, a chain drive extending from said crank to said shaft, flexible means drivingly connecting said shaft with said first coaster brake, a second coaster brake operatively connected with said second wheel, means including a manually operable lever located near said seat for the convenience of the cyclist in actuating said lever for operating said second coaster brake.

2. The cycle of claim 1 wherein said means that are drivingly connected between said first coaster brake and said hub further include: a pair of arms, means adjustably securing said arms to said frame, bearings in said arms, and said shaft mounted for rotation in said bearings.

References Cited in the file of this patent

UNITED STATES PATENTS

| | | |
|---|---|---|
| 593,597 | Millar | Nov. 16, 1897 |
| 621,034 | Cordle | Mar. 14, 1899 |
| 2,177,793 | Taylor | Oct. 31, 1939 |
| 2,588,047 | Riga et al. | Mar. 4, 1952 |

FOREIGN PATENTS

| | | |
|---|---|---|
| 709,378 | France | May 18, 1931 |